(No Model.)
6 Sheets—Sheet 2.

F. C. MILLER & J. H. WALKER.
MIDDLINGS PURIFIER AND DUST COLLECTOR.

No. 446,876. Patented Feb. 24, 1891.

(No Model.) 6 Sheets—Sheet 5.

F. C. MILLER & J. H. WALKER.
MIDDLINGS PURIFIER AND DUST COLLECTOR.

No. 446,876. Patented Feb. 24, 1891.

WITNESSES: Chas Nieder, C. Sedgwick

INVENTOR: F. C. Miller, J. H. Walker
BY Munn & Co.
ATTORNEYS

(No Model.) 6 Sheets—Sheet 6.

F. C. MILLER & J. H. WALKER.
MIDDLINGS PURIFIER AND DUST COLLECTOR.

No. 446,876. Patented Feb. 24, 1891.

WITNESSES:
Chas. Nida
C. Sedgwick

INVENTOR:
F. C. Miller
J. H. Walker
BY Munn & Co.
ATTORNEYS

UNITED STATES PATENT OFFICE.

FERDINAND C. MILLER AND JOHN H. WALKER, OF OREGON CITY, OREGON.

MIDDLINGS-PURIFIER AND DUST-COLLECTOR.

SPECIFICATION forming part of Letters Patent No. 446,876, dated February 24, 1891.

Application filed March 19, 1890. Serial No. 344,443. (No model.)

*To all whom it may concern:*

Be it known that we, FERDINAND C. MILLER and JOHN H. WALKER, of Oregon City, in the county of Clackamas and State of Oregon, have invented a new and Improved Middlings-Purifier and Dust-Collector, of which the following is a full, clear, and exact description.

The object of the invention is to provide a new and improved combined middlings-purifier and dust-collector, which is simple and durable in construction, very effectively purifies and grades the middlings, and at the same time collects all dust and other impurities separating from the middlings, which latter are not subjected to any harsh treatment, so as to become floured or broken.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Fig. 5 is an enlarged side elevation of the feed-hopper and adjacent parts. Fig. 6 is an enlarged sectional side elevation of part of one of the air-channels. Fig. 7 is an enlarged plan view of part of the middlings-leader. Fig. 8 is an inverted plan view of the same.

The improved middlings-purifier and dust-collector is provided with a suitably-constructed frame A, on one end of which is mounted to turn in suitable bearings the transversely-extending main driving-shaft B, connected with suitable machinery for imparting a rotary motion to the same. The several mechanisms of the machine are actuated for this main driving-shaft.

On the driving-shaft B is secured a pulley B', over which passes a belt $B^2$, also passing over a pulley $B^3$, secured on a shaft C, extending transversely below the shaft B, and mounted to turn in suitable bearings fastened to the end of the frame A. On one outer end of this shaft C is secured a pinion C', which meshes into a gear-wheel $C^2$, mounted to rotate loosely on a stud $C^3$, secured on the frame A. To the outer face of the gear-wheel $C^2$ is secured a sprocket-wheel $C^4$, over which passes a sprocket-chain $C^5$, which extends upward and passes over a sprocket-wheel $C^6$, secured on one outer end of the transversely-extending feed-roller shaft D', mounted to turn in suitable bearings in the main frame A, and carrying on the inside of the said frame the feed-roller D.

Above the feed-roller D is arranged a hopper $D^2$, adapted to receive the stock to be purified. The hopper $D^2$ is provided with the usual ends and the sides $D^3$ and $D^4$, of which the side $D^3$ extends at its lower edge onto the feed-roller D, while the other side $D^4$ extends at its lower edge a suitable distance from the said feed-roller to form an opening for passing the stock to the interior of the machine—that is, into the vibrating screen E.

In order to vary the discharge of the stock from the feed-hopper D, a regulating device is employed, which is provided with a weight-board $D^5$, extending transversely in the hopper $D^2$ and pivotally connected at its upper end to the side of the side $D^4$. (See Fig. 5.) From the upper end of this weight-board $D^5$ extend through suitable openings in the side $B^4$ one, two, or more rods $D^6$, connected at their outer ends with bolts $D^7$, pivotally connected with a gate $D^8$, having a beveled lower edge adapted to engage the periphery of the feed-roller D, the said gate being held to slide on the outside of the side $D^4$. A nut $D^9$ screws on the upper end of each bolt $D^7$ against the respective rod $D^6$, and a spring $D^{10}$ is coiled on the said bolt and presses with one end against the gate $D^8$ and with its other end against a bearing $D^{11}$, secured to the side $D^4$ and guiding the respective bolt $D^7$. By adjusting the nuts $D^9$ the gate $D^8$ can be raised or lowered, so as to permit more or less stock to pass from the hopper over the feed-roller D, and at the same time by adjusting the nuts the lower edge of the gate can be kept level.

The stock in the hopper $D^2$ exerts a pressure against the weight-board $D^5$, so that the latter swings on its pivots and by the arm $D^6$, pressing on the nuts $D^9$, acts on the bolts $D^7$, connected with the gate $D^8$, so that the latter opens more freely when the weight-board $D^5$ swings downward. When the latter swings upward by a pressure from underneath, then the springs $D^{10}$ force the gate $D^8$ downward toward the feed-roller D, so as to shut off the supply of stock to the screen E. Thus by the weight-board $D^5$ and the gate $D^8$, connected with it, the feeding of the stock from the hopper $D^2$ to the screen E is automatically accomplished. The stock, after it leaves the feed-roller D, falls onto a transversely-extending inclined board $D^{12}$, fixed to the sides of the frame A and discharging the stock into the upper end of the slightly-inclined screen E, which is provided with the usual frame E', and a bolting-cloth $E^2$ stretched over the under side of the frame E'. The sides of the bolting-cloth $E^2$ are held in vertically-adjustable beams $E^3$, hung on the bolts $E^4$, turning in hangers F', attached at the upper end to the side rails of the frame E' and extending downward to connect at their lower ends with the middlings-gatherer F, arranged below the screen E and vibrating with the same.

Figures 9, 10:
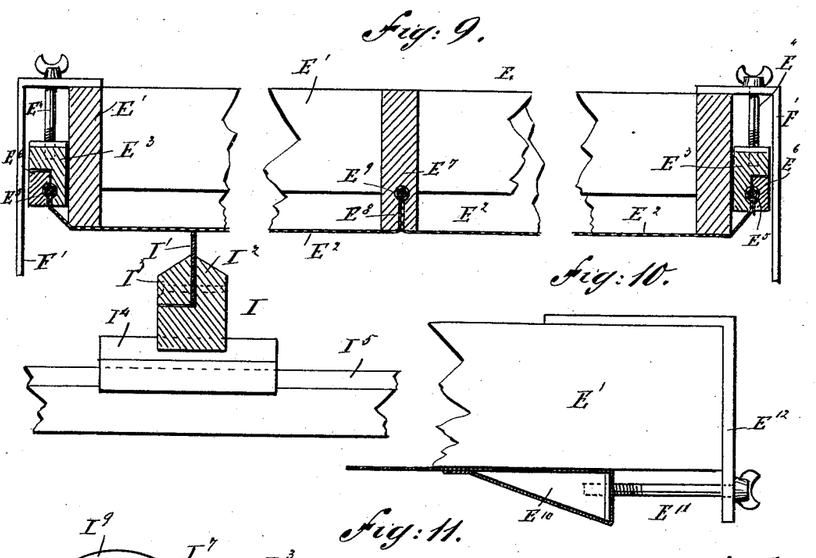
Fig. 9 is an enlarged transverse section of the screen and screen-scraper.
Fig. 10 is an enlarged side elevation of the screen-stretching device.

In order to hold the sides of the bolting-cloth $E^2$ in place on the beams $E^3$ the latter are rabbeted and formed with a recess $E^5$, into which the edge of the bolting-cloth is passed and held by a strip $E^6$, secured in the rabbet of the beam $E^3$ by screws. The edges of the bolting-cloth are formed with a welt having a string, said welt fitting in the recesses formed in the beam $E^3$ and the strip $E^6$, as is plainly shown in Fig. 9. The bolting-cloth $E^2$ is fastened near its middle to the longitudinal central rail of the frame E' by passing the middle part of the bolting-cloth through a slot $E^8$ in the under side of the said central rail $E^7$, and then forming a welt with a string in this middle part of the bolting-cloth, which welt passes through a recess $E^9$, formed at the end of the groove $E^8$ in the central longitudinal rail $E^7$. When the operator desires to stretch the bolting-cloth $E^2$ sidewise, he turns the several bolts $E^4$ so as to raise the longitudinal beams $E^3$, which thereby pull sidewise on the bolting-cloth and stretch the same. The head end of the bolting-cloth is secured to the head rail of the frame E' by suitable hooks, button-holes and buttons, staples, &c. The foot end of the bolting-cloth is provided with a pocket, in which is inserted a bar $E^{10}$, preferably wedge-shaped in cross-section. Into this bar $E^{10}$ screws the horizontally-extending bolts $E^{11}$, mounted to turn in brackets $E^{12}$, secured to the foot end of the frame E' of the screen E, (see Fig. 10,) so that by turning the bolts $E^{11}$ the bolting-cloth can be stretched lengthwise. The bolting-cloth $E^2$ is made in sections of different mesh, which vary from one end to the other in such a manner that the finest section of the cloth is near the head end, and then the meshes increase in size toward the foot.

The screen E, as well as the middlings-carrier F, supported on the said screen by the hangers F', is mounted to swing on arms $F^2$, pivotally connected with the end hangers F' on each side of the machine. Each of the arms $F^2$ extends downward and is pivotally connected to an arm $F^3$, vertically adjustable on the outside of the frame G for the lower or finishing part of the middlings-purifier. The arms $F^2$ permit the screen and the middlings-carrier F to swing longitudinally, and the vibrating motion is imparted to the said screen by a vibrating mechanism H, connected with the head end of the screen E and operated from the main driving-shaft B.

Figure 2:
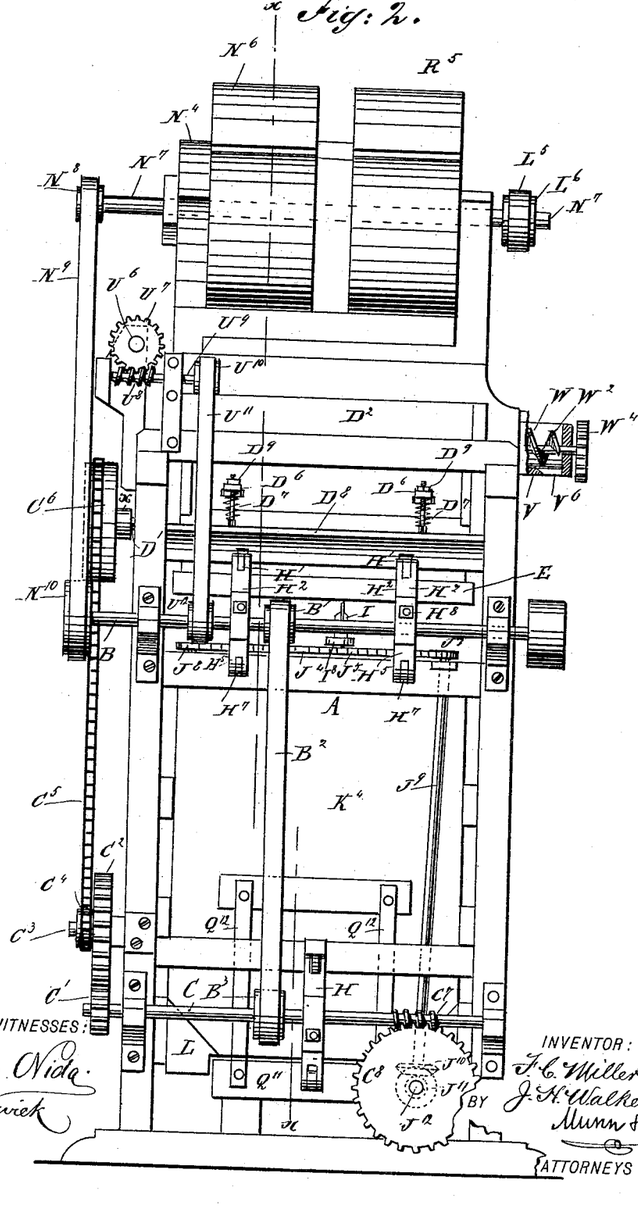
Fig. 2 is an end elevation of the same.
Figure 3:
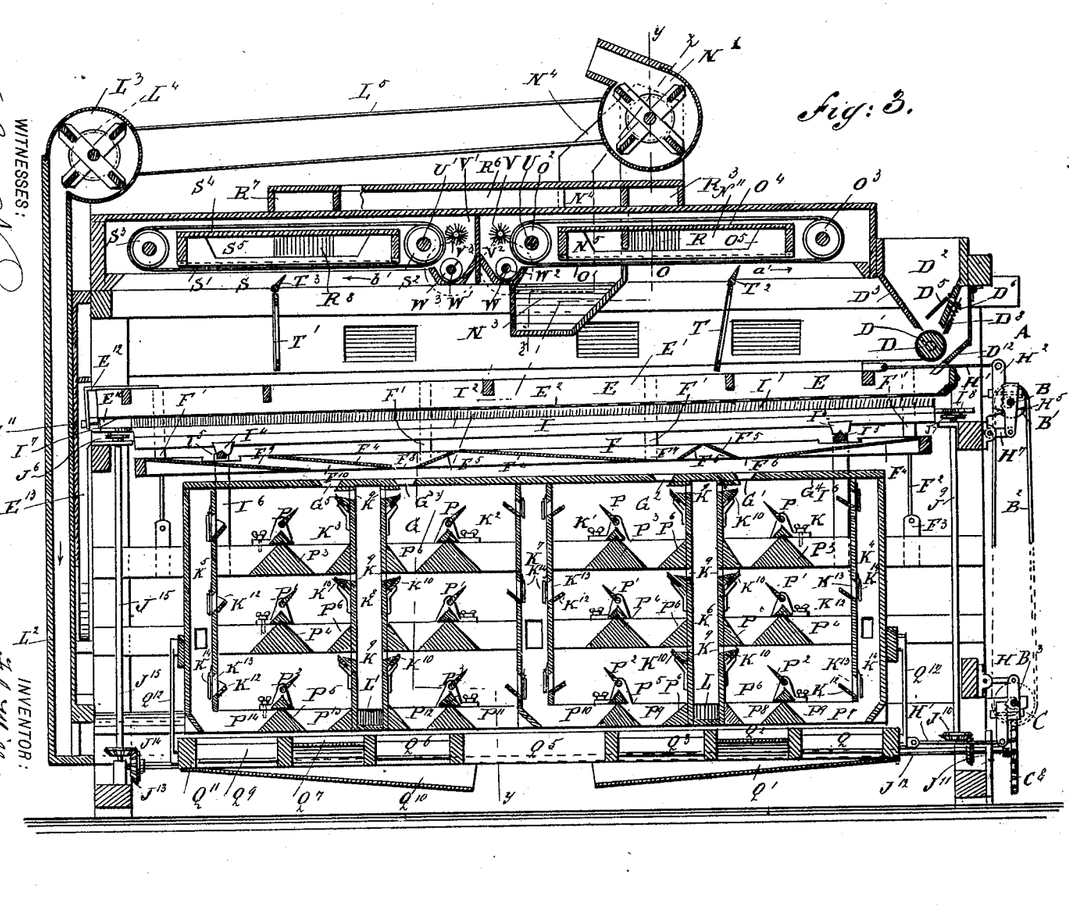
Fig. 3 is a longitudinal sectional side elevation of the same on the line $x$ $x$ of Fig. 2.
Figures 11, 12:
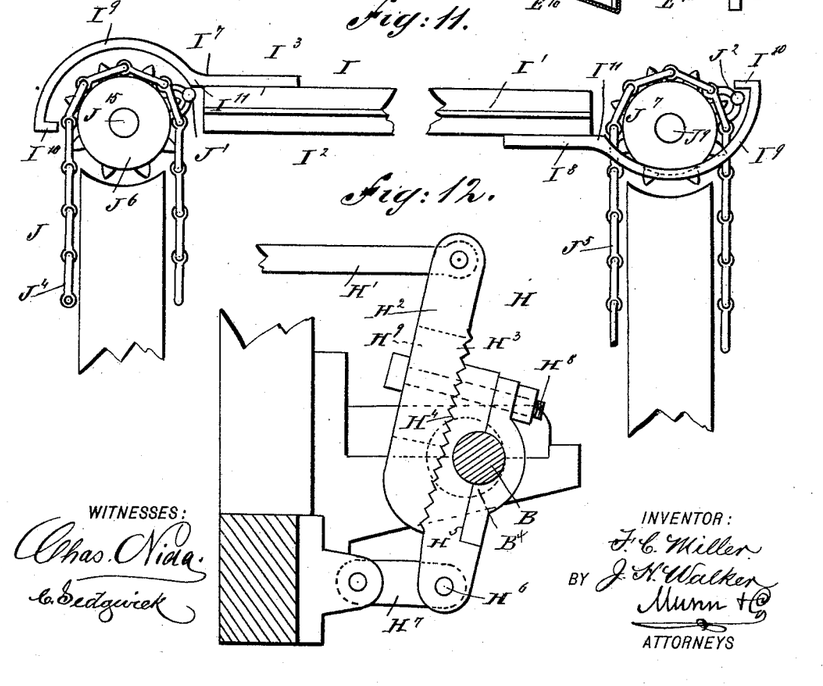
Fig. 11 is an enlarged plan view of part of the screen-scraper.
Fig. 12 is an enlarged side elevation, with parts in section, of the adjustable eccentric for vibrating the screen.

One of the transverse rails of the frame E' of the screen E is pivotally connected by links H', which extend outward through the head end of the frame A above the main driving-shaft B, as is plainly shown in Figs. 2, 3, and 12. The outer end of each link H' is pivotally connected with an arm $H^2$, provided on one edge with a series of teeth $H^3$, adapted to mesh into teeth $H^4$, formed on another arm $H^5$, the lower end of which is pivotally connected at $H^6$ to a link $H^7$, fulcrumed on the end of the frame A. The arm $H^2$ is fastened to the arm $H^5$ by a bolt $H^8$ held in the arm $H^5$ and passing through a slot $H^9$ in the said arm $H^2$. The arm $H^5$ is engaged by an eccentric $B^4$, formed on the main driving-shaft B. When the latter is rotated, the eccentric $B^4$ imparts a swinging motion to the arm $H^5$, which, on account of being rigidly connected with the arm $H^2$, imparts a forward and backward motion to the link H', connected with the screen E, so that the latter is vibrated longitudinally. In order to increase or diminish the throw imparted to the screen E, the operator slackens the bolt $H^8$ and then shifts the two arms $H^2$ and $H^5$ to lengthen or shorten the distance between the pivotal connection of the link H' with the arm $H^2$ and the pivot $H^6$. The teeth $H^3$ and $H^4$, meshing one in the other, permit such movement, and when the bolt $H^8$ is screwed up the said teeth firmly hold the two arms $H^2$ and $H^5$ together. Thus by a very simple means the throw given to the screen E can be regulated at any time.

In order to clean the meshes of the bolting-cloth $E^2$ of the screen E, a scraping-device I is employed, provided with a longitudinally-extending brush I', adapted to slide transversely and engaging the under side of the bolting-cloth $E^2$. The brush I' is preferably formed of a strip of felt or cashmere set into a longitudinally-extending bar I² and fastened thereto by a strip I³, set in a rabbet in the bar I² to abut against the said brush I′, and fastened to the bar I², as is plainly illustrated in Fig. 9. The longitudinal bar I² is provided with two or more transversely-extending shoes I⁴, fitted to slide on transversely-extending guideways I⁵, supported at their lower ends by arms I⁶, adapted to be vertically adjusted on the outside of the frame G, previously mentioned, and containing the final purifying device. Each guideway I⁵ is preferably V-shaped on top, and a correspondingly-shaped groove is formed on the under side of the shoe I⁴. This is done to prevent any middlings, after passing through the bolting-cloth E², from remaining on top of the guideways I⁵, as the latter, with their sharp projecting edges, cause the middlings to fall downward.

The bar I² is moved transversely by a mechanism J, arranged in the following manner: On the end of each bar I² is secured an arm I⁷ or I⁸, respectively, which are alike in construction, but arranged to extend in opposite directions, as is plainly shown in Figs. 2 and 11. Each arm I⁷ or I⁸ is provided with a curved part I⁹, extending from the bar I², and provided at its outer end with an inwardly-extending lug I¹⁰. A shoulder I¹¹ is formed on the inner end of each curved part I⁹, and this shoulder I¹¹, as well as the lug I¹⁰, is adapted to be alternately engaged by vertically-arranged pins J′ and J², held on one of the links of the sprocket-chain J⁴ or J⁵, respectively, passing over the horizontally-arranged sprocket-wheels J⁶ and J⁷, respectively, and also passing over sprocket-wheels J⁸, mounted to turn on studs secured to the main frame, as is plainly shown in Fig. 2. The sprocket-chains J⁴ and J⁵ extend transversely.

The sprocket-wheel J⁷, over which passes the sprocket-chain J⁵, is secured on the upper end of an upright shaft J⁹, mounted to turn in suitable bearings in one end of the main frame A. On the lower end of this shaft J⁹ is secured a bevel gear-wheel J¹⁰, which meshes into a bevel gear-wheel J¹¹, secured on a shaft J¹², extending longitudinally near the bottom of the frame A and mounted to turn in suitable bearings in the same. On the rear end of the said shaft J¹² (see Fig. 3) is secured a bevel gear-wheel J¹³, which meshes into a bevel gear-wheel J¹⁴, fastened on the lower end of an upright shaft J¹⁵, mounted to turn in suitable bearings in the lower end of the frame A, and carrying at its upper end the sprocket-wheel J⁶, previously mentioned.

The shaft J¹² is operated from the shaft C, driven by the main driving-shaft B, as previously mentioned, the said shaft C being provided for this purpose with a worm C⁷, meshing into a worm-wheel C⁸, secured on the shaft J¹² near the bevel-wheel J¹¹, so that when the shaft C is rotated from the main driving-shaft it imparts a slow rotary motion by the worm C⁷ and the worm-wheel C⁸ to the shaft J¹², which by the gear-wheels J¹¹ and J¹⁰ imparts a rotary motion to the upright shaft J⁹, and also imparts a rotary motion by the gear-wheels J¹³ and J¹⁴ to the upright shaft J¹⁵. As the shafts J⁹ and J¹⁵ carry the sprocket-wheels J⁷ and J⁶, respectively, the chains J⁵ and J⁴, respectively, are caused to travel, passing over their idlers J⁸. The traveling motion of the chains J⁴ and J⁵ moves the longitudinally-extending bar I², carrying the brush I′ laterally in the following manner:

When the chains J⁴ and J⁵ are in motion, the bar I² is carried rearward by the pins J′ and J² pressing against the shoulder I¹¹ of the arm I⁷ and the lug I¹⁰ of the arm I⁸, respectively. When the bar I² has reached its outermost position, the pin J′ disengages the shoulder I¹¹, and the pin J² passes off the lug I¹⁰, so that the bar I² remains stationary, and the pins J′ and J² travel around one half of the sprocket-wheels J⁶ and J⁷ until the pin J′ strikes against the inside of the lug I¹⁰ and the pin J² strikes against the shoulder I¹¹ of the arm I⁸. As both pins strike simultaneously the parts referred to, the bar I² is carried along—that is, moved forward under the under side of the bolting-cloth E²—so that the brush I′ scrapes the meshes of the bolting-cloth, thus cleaning the same. When the pins J′ and J² have carried the bar I² into its forward position, then the said pin J′ slips off the lug I¹⁰ and the pin J² passes off the shoulder I¹¹ of the arm I⁸ and travels around the outer half of the sprocket-wheels J⁸ to engage the shoulder I¹¹ of the arm I⁷ and the lug I¹⁰ of the arm I⁸, respectively, so as to move the bar I² backward to cause the brush I′ to again scrape the bolting-cloth E². During the time the pins J′ and J² travel around the outer halves of the sprocket-wheels J⁶, J⁷, and J⁸, as above described, the bar I² with the brush I′, remains stationary. The movement imparted to the sprocket-chains I⁴ and I⁵ from the main driving-shaft B, as previously mentioned, is very slow, so that the brush I′ cleans the meshes of the bolting-cloth E² very thoroughly.

The middlings-gatherer F, located below the screen E and moving with the latter, is provided with an open frame, in which are arranged sets of transversely-extending hoppers, each having a long inclined side F⁴ and a short steep inclined side F⁵, the lower ends of both sides forming an opening F⁶, F⁷, or F⁸, respectively, discharging into the openings G′, G², and G³, respectively, formed transversely in the closed top G⁴ of the frame G for the lower or finishing part of the purifier previously mentioned. At the lower end of the gatherer F is arranged an inclined side F⁹, which extends partly under the next following inclined side F⁴ and forms with the latter the opening F¹⁰, which registers with an opening G⁵, formed in the top G⁴ of the frame G. The several openings G′, G², G³, and G⁵ open into compartments K K′ K² K³, respectively, formed in the closed frame G.

The middlings from the screen E pass through the several sections of the bolting-cloth E² onto the middlings-gatherer F in such a manner that the finest middlings fall onto the first set of sides F⁴ and F⁵, which discharge through the opening F⁶ and through the opening G' into the compartment K of the frame G. The next finest middlings fall onto the next section of the gatherer F and pass through the openings F⁷ and G² into the compartment K'. The coarser middlings fall onto the sides of the next section of the middlings-gatherer and pass through the openings F⁸ and G³ into the compartment K². The last or coarsest middlings pass onto the inclined side F⁹ and through the openings F¹⁰ and G⁵ into the compartment K³. The bran, passing over the end of the bolting-cloth E², falls into a downwardly-extending chute E¹³, arranged on one end of the main frame A and leading to the outside of the machine.

In the ends of the compartments K and K³ are formed the vertically-extending suction-channels K⁴ and K⁵, and the compartments K' and K² are separated from each other by a third suction-channel K⁷, extending vertically and transversely from one side of the frame to the other. The compartments K and K' are separated from each other by the blast-channel K⁶, arranged vertically and extending transversely from side to side of the frame G, and in a similar manner the compartments K² and K³ are separated from each other by a blast-channel K⁸. The blast-channels K⁶ and K⁸ are connected at their lower ends at each side of the frame G with longitudinally-extending channels L and L', connected at one end with a vertically-extending channel L², leading to a blower L³ of any approved construction.

Figures 4, 13, 14:
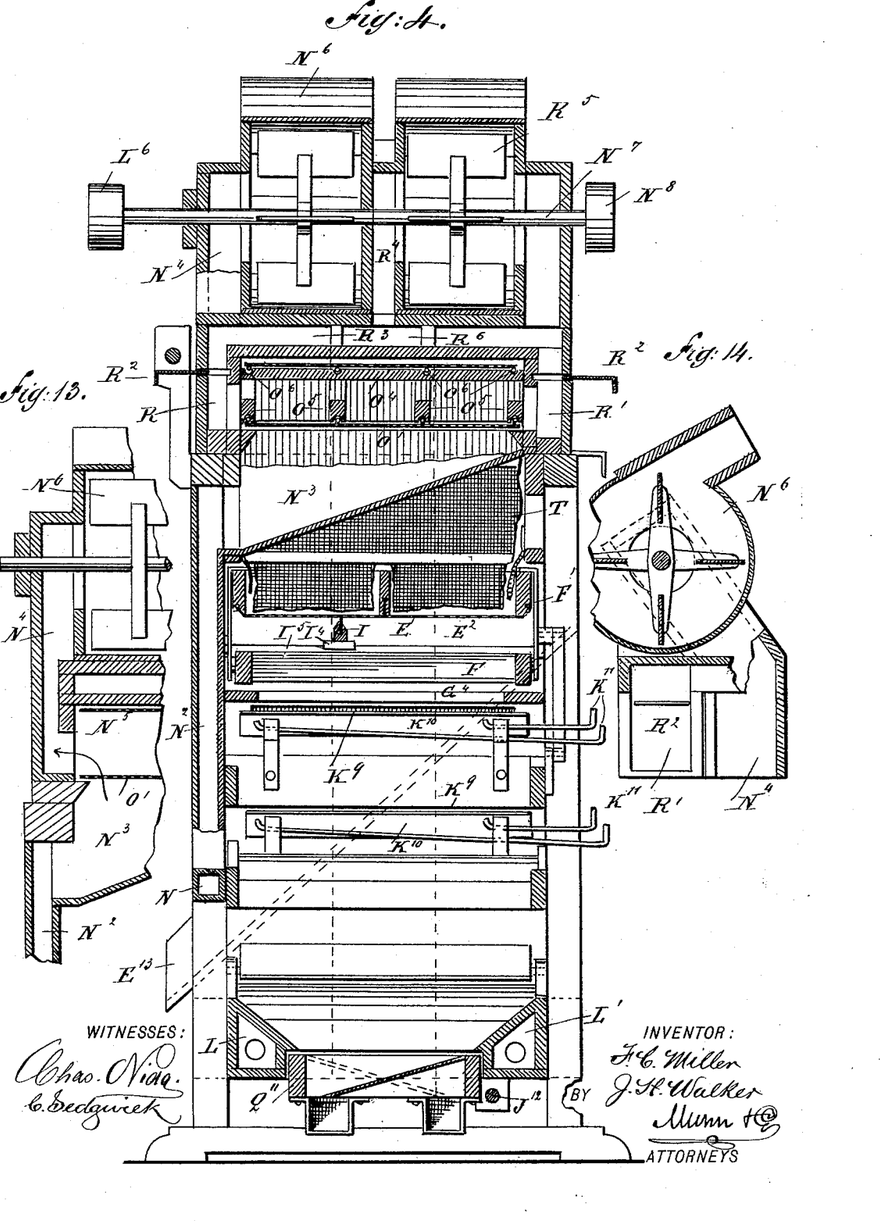
Fig. 4 is an enlarged transverse section of the same on the line $y$ $y$ of Figs. 1 and 3.
Fig. 13 is an enlarged transverse section of one of the suction-fans and adjacent parts on the line $z$ $z$ in Fig. 3.
Fig. 14 is a sectional side elevation of the same.

The suction-channels K⁴, K⁷, and K⁵ open at one end into a longitudinally-extending channel N, containing slides N' near the channels K⁴, K⁷, and K⁵, to regulate the amount of air passing from the said channels. (See Fig. 1.) The middle of this longitudinally-extending channel N is connected with an upwardly-extending channel N², leading to a transversely-extending channel N³, having an inclined bottom, and over which passes the cloth O' of the dust-collector O. The channel N³ is connected above the cloth O' with a vertical channel N⁴, leading to a suction-fan N⁶ of any approved construction. (See Figs. 4, 13, and 14.) The suction-fan N⁶ is operated from the main driving-shaft, and for this purpose its shaft N⁷ carries at one end a pulley N⁸, over which passes a belt N⁹, also passing over a pulley N¹⁰, secured on the main driving-shaft B, as plainly illustrated in Fig. 1. On the other end of the shaft N⁷ is arranged a pulley L⁶, over which passes a belt L⁵, also passing over a pulley L⁴, (shown in dotted lines in Fig. 3,) and attached to the shaft of the blower L³. Thus when the shaft N⁷ is rotated to actuate the fan N⁶ the blower L³ is actuated at the same time, so that both the blast from the blower L³ and the suction from the fan N⁶ operate simultaneously in the several compartments K, K', K², and K³.

Each of the blast-channels K⁶ and K⁸ is provided with a series of side openings K⁹, leading to the several compartments K, K', K², and K³. Each opening K⁹ is adapted to be opened or closed by a slide K¹⁰, mounted to slide in suitable guideways fastened to the outside of the channels, the said slides being operated from the outside of the machine by suitable crank-arms K¹¹ or other suitable means. (See Fig. 4.)

When the machine is in operation, the air forced by the blower L³ passes from the latter through the channels L², L, and L' into the blast-channels K⁶ and K⁸, and from the latter through the openings K⁹ into the several compartments, so as to act on the middlings passing down the compartments through the respective openings G', G², G³, and G⁵. The lighter particles are there separated by the incoming air from the heavier particles, which latter fall downward in the compartments, while the light particles fall onto the inclined boards K¹², arranged transversely on the inside of the suction-channels K⁴, K⁵, and K⁷. The boards K¹² open onto channels K¹³, formed on the inside of the said channels K⁴, K⁵, and K⁷, said openings being provided on the insides of the channels with inwardly self-opening valves K¹⁴, opened by the suction of air from the fan N³.

In each of the compartments K, K', K², and K³ are arranged a series of valves P, P', and P², one located above the other opposite the openings K⁹ and adapted to be set at any inclination, according to the work to be performed. The said valves serve to direct the current of air passing from the blast-channels K⁶ and K⁸ onto the middlings, so that as the heaviest fall downward in the compartments the lighter are blown over the valves to pass downward, while the lightest particles or dust pass readily onto the inclined boards K¹², leading to the openings in the suction-channels K⁴, K⁵, and K⁷. Under the several valves P, P', and P² are arranged triangular transversely-extending beams P³, P⁴, and P⁵, which serve to guide the middlings in their downward course and to agitate the same, so as to permit the air to act more readily on the same, in order to separate the lighter particles from the heavier ones. Under each valve P, P', or P² is arranged a small triangular cross-bar resting with its base on the point of the respective beams P³ P⁴ P⁵ and serving to guide the middlings onto the said beams.

On each side of the blast-channels K⁶ and K⁸ are arranged beveled beams P⁶, located opposite the beams P³, P⁴, and P⁵ and forming with the latter, hoppers through which the middlings have to pass in their downward course. The lowermost beams P⁵ and P⁶ form a series of hoppers P⁷ P⁸ P⁹ P¹⁰ P¹¹ P¹² P¹³ P¹⁴ in the bottom of the frame G. The hopper P⁷ opens into a transversely-extending chute Q, leading at its lower end into a longitudinally-extending chute Q', opening under the machine near its middle, as is plainly shown in Figs. 3 and 8. The next following hopper P$^8$ of the compartment K opens into a transversely-extending chute Q$^2$, and the hopper P$^9$ of the compartment K' opens in a similarly-extending chute Q$^3$, which, with the chute Q$^2$, opens into a longitudinally-extending chute Q$^4$, extending parallel with the chute Q' and opening under the machine near its middle.

The hopper P$^{10}$, next to the hopper P$^9$ in the compartment K', opens into a transversely-extending chute Q$^5$, opening at one side of the machine. The hopper P$^{11}$ of the compartment K$^2$ also opens into this chute Q$^5$. The next following hopper P$^{12}$ of the compartment K$^2$ and the hopper P$^{13}$ of the compartment K$^3$ open into two transversely-extending chutes Q$^6$ and Q$^7$, both leading into a longitudinally-extending chute Q$^8$, arranged in line with the chute Q$^4$ and discharging under the machine near its middle.

The last hopper P$^{14}$ in the compartment K$^3$ opens into a transversely-extending chute Q$^9$, discharging into a longitudinally-extending chute Q$^{10}$, arranged in line with the chute Q', and also discharging near the middle of the machine. The lower open ends of the suction-channels K$^4$, K$^5$, and K$^7$ open into the hoppers P$^7$, P$^{14}$, and P$^{10}$, respectively, so that in case heavier particles pass into the said channels through the openings K$^{13}$ they can drop down the said channels into the respective transverse chutes Q, Q$^9$, and Q$^5$. The several chutes Q Q' Q$^2$ Q$^3$ Q$^4$ Q$^5$ Q$^6$ Q$^7$ Q$^8$ Q$^9$ Q$^{10}$ are secured on a suitably-constructed frame Q$^{11}$, hung at its ends on links Q$^{12}$, supported from the ends of the frame G. In order to move the separated middlings in the several chutes so as to cause the same to pass to the outside of the machine, one end of the frame Q$^{11}$ is connected with a vibrating device H, similar to the one above described in reference to the vibrating mechanism for the screen. This vibrating mechanism H is connected with and operated from the shaft C, which derives its motion from the main shaft B, as previously described.

When the machine is in operation, the air forced by the blower L$^3$ into the several compartments K K' K$^2$ K$^3$ acts on the downwardly-falling middlings so as to separate the lighter particles from the heavier ones, which latter pass to the several chutes discharging on the outside, so that five different grades of middlings are obtained, the finest grade being discharged by the chute Q', the next by the chute Q$^4$, the medium grade by the chute Q$^5$, the next following by the chute Q$^8$, and the coarsest by the chute Q$^{10}$.

The dust-collector O is provided with an endless traveling cloth O', preferably made of bolting-cloth having mesh No. 16, and passing over two rollers O$^2$ and O$^3$, extending transversely and mounted to turn in suitable bearings in the closed top of the frame A. Between the two rollers O$^2$ and O$^3$ is arranged a table O$^4$, over which passes the uppermost part of the endless cloth O', and from the under side of the said table extend longitudinal strips O$^5$, on the bottom of which travels the lower part of the said endless cloth O'.

The table, with its strips O$^5$, prevents the parts of the endless cloth O' from being drawn together when suction is applied from the fan, as hereinafter more fully described. The endless traveling cloth O' passes through the channel N$^3$, as previously mentioned, so that the air drawn by the fan N$^6$ through the channel N$^4$ travels from the channel N$^3$ through that part of the endless traveling cloth O' and through a separate compartment N$^5$, formed underneath the table N$^4$, one end of the said compartment leading to the channel N$^4$. The other compartment N$^{11}$, formed beneath the table O$^4$, extends over a space formed in the main frame A, over the screen E, and the sides of this compartment are connected with channels R and R', (see Figs. 3 and 4,) each containing a valve R$^2$ and both leading to a transversely-extending channel R$^3$, from the middle of which leads upward a channel R$^4$, opening into the suction-fan R$^5$, arranged alongside the suction-fan N$^6$, and having its wheel mounted on the shaft N$^7$, previously mentioned, and operating the suction-fan N$^6$.

From the transverse channel R$^3$ extends longitudinally a channel R$^6$, arranged on the top of the frame A and leading into a transversely-extending channel R$^7$, opening in downwardly-extending channels R$^8$, leading to the sides of a compartment formed by a second dust-collector S, similar in construction to the collector O, previously described. In each of the channels R$^8$ is arranged a valve R$^9$ for regulating the suction. The collector S is provided with the endless traveling cloth S', passing over the rollers S$^2$ and S$^3$, between which is arranged a table S$^4$, having longitudinal strips S$^5$ to prevent the cloth from being drawn together by the suction from the fan R$^5$. The lower part of the endless traveling cloth S' is arranged over the space above the lower end of the screen E, as is plainly shown in Fig. 3.

Figure 1:
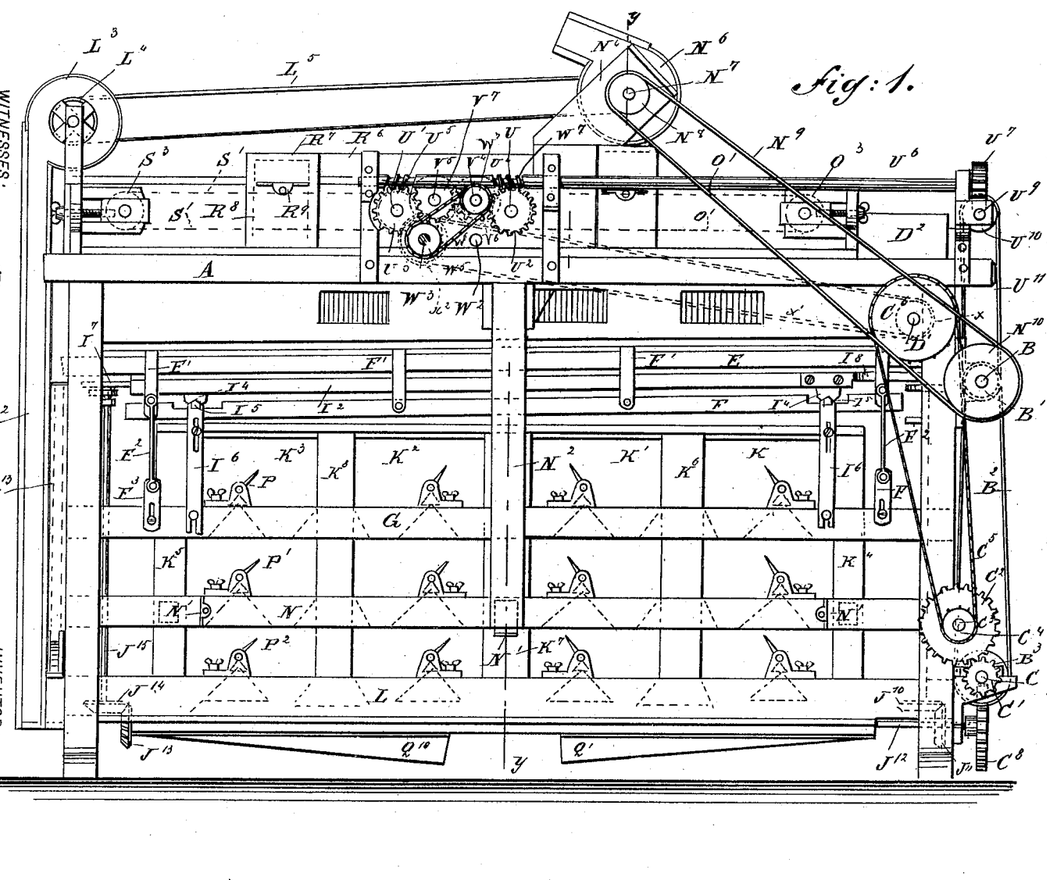
Figure 1 is a side elevation of the improvement.

The rollers O$^2$ O$^3$ and S$^2$ S$^3$ of the two dust-collectors O and S are covered with soft flannel or other suitable material, and the outermost rollers are journaled in boxes held longitudinally adjustable by suitable means, such as shown in Fig. 1. Each of the traveling cloths O' and S' is provided on its inside with a series of endless strips O$^6$, traveling in correspondingly-shaped longitudinal grooves formed on the tops of the tables O$^4$ and S$^4$ and on the under sides of the strips O$^5$ and S$^5$, respectively. In order to permit a smooth passage of the strips O$^6$ around the respective rollers, the latter are provided with annular grooves for the same. It is understood that these strips serve to strengthen the bolting-cloth O' or S', respectively, so as to prevent its breaking and to hold it in shape.

It will be seen that when the two fans L⁶ and R⁵ are in operation a suction is caused in the compartments K, K', K², and K³, as previously described, so that the impurities passing through the channels N, N², and N³ come in contact in the last-named channel with the under side of the traveling cloth O' and adhere to the latter, while the air passes through the compartment N⁵ and to the channel N⁴, and from the latter to the fan N⁶. The impurities adhering to the under side of the cloth O' are carried along by the latter to be finally scraped off, as hereinafter more fully described. At the same time a suction is produced by the fan R⁵ in the channels R⁴ R³ R R', the compartment N¹¹ under the table O⁴, and in the space above the front end of the screen E, so that the middlings passing onto the said screen E from the hopper D² are agitated, and the very light particles are drawn upward by the said suction against the under side of the cloth O' to be carried along with the other impurities from the channel R³, as above described. In a similar manner the impurities from the screen E at its rear end pass onto the under side of the cloth S' by the suction from the fan R⁵ through the channels R⁸, R⁷, and R⁶, leading from under the table S⁴ to the fan R⁵.

In order to further regulate the upward motion of the impurities from the screen E, two upright screens T and T' are arranged between the screen E and the under side of the cloths O' and S', as is plainly shown in Fig. 3. The screens T and T' are suspended at their upper ends and hang loosely downward onto the screen E. On the suspended ends of the screens T and T' are arranged transversely-extending valves T² and T³, adapted to be placed in any desired position, so as to assist in regulating the current of air passing up to the dust-collecting cloths O' and S', respectively.

The screens T and T' serve to regulate the current of air on the middlings on their passage over the screen E. Thus from the front end of the screen E, where the middlings drop from the feed-roller D down on the cloth E² to the tail end of the machine, they are kept constantly mingling with a controlled current of air. The light fluffy fiber, with the dust and other impurities, is carried up against the cloths O' and S' of the dust-collectors, which cloths carry the same along to be discharged, as presently to be described.

The cloths O' and S' pass into compartments V and V', containing the rollers O² and S², and in which are mounted to turn revolving brushes V² and V³ in contact with the cloths O' and S', respectively, so as to brush off any impurities adhering to the said cloths. The brushes V² and V³ are formed on transversely-extending shafts V⁴ and V⁵, carrying on their outer ends the gear-wheels V⁶ and V⁷, one in mesh with the other, so that the two brushes revolve together when one of the said shafts is revolved. The impurities brushed off by the brushes V² and V³ from the cloths O' and S' fall into the V-shaped bottom of the compartments V and V', in which bottoms operate the transversely-extending conveyer-screws W and W', secured on transversely-extending shafts W² and W³, geared together at one outer end by gear-wheels W⁴. The bottoms of the compartments V and V' are extended to one side of the machine, as is plainly shown in Fig. 2, the outer ends of the said bottoms being provided with openings V⁶, through which passes the dust to the outside of the machine, the dust being carried to the said openings V⁶ by the conveyer-screws W and W'.

In order to impart the necessary motion to the dust collectors and conveyers, the shafts U and U', carrying the rollers O² and S², are provided on their outer ends with worm-wheels U² and U³, respectively, in mesh with worms U⁴ and U⁵, respectively, formed on a longitudinally-extending shaft U⁶, mounted to turn in suitable bearings on the top of the main frame A. The outer end of the shaft U⁶ is provided with a worm-wheel U⁷, in mesh with a worm U⁸, formed or secured on a transversely-extending short shaft U⁹, mounted to turn in suitable bearings at one end of the main frame A. On the shaft U⁹ is secured a pulley U¹⁰, over which passes a belt U¹¹, also passing over a pulley U¹², secured on the main driving-shaft B. Thus when the latter is rotated a rotary motion is transmitted to the shafts U⁹ and U⁶, which latter, by the worms U⁴ and U⁵ and the worm-wheels U² and U³, respectively, turns the rollers U² and S² of the dust-collectors O and S, so that the cloths O' and S' receive a traveling motion in the direction of the arrows a' and b' indicated in Fig. 3.

One of the conveyer-shafts W³ receives a rotary motion from a pulley x on the shaft D' by a belt x' to a pulley x² on said conveyer-shaft, and this conveyer-shaft carries a sprocket-wheel W⁵, over which passes a sprocket-chain W⁶, also passing over a sprocket-wheel W⁷, secured on the shaft V⁴ of the revolving brush V. Thus when the conveyer is rotated, as above described, a rotary motion is imparted by the said sprocket-wheel W⁵, the chain W⁶, and the sprocket-wheel W⁷ to the revolving brush V², and as the latter is geared with the other revolving brush, both rotate simultaneously when the rollers O² and S² are set in motion.

The operation is as follows: When the main driving-shaft B is rotated, the several mechanisms are set in motion, as above described. The stock to be operated on is placed in the hopper D² and passes from the latter over the feed-roller D onto the screen E, which grades the middlings by the sections of different mesh, so that the finest grade passes into the first section of the gatherer F, and from the latter to the compartment K, as previously described. The other grades pass from the screen to the other compartments K', K², and K³, respectively, while the bran or tailings pass over the end of the screen into the chute E¹³ and to the outside. The middlings, passing into the several compartments, are treated therein by the blast and suction of air in the manner previously described, so that the purified middlings finally are discharged into the several chutes arranged in the shaking-frame Q¹¹, as above described. The impurities from the several compartments pass into the suction-channels K⁴, K⁵, and K⁷, and are drawn through the chutes N and N² into the channel N³ and against the under side of the cloth O' of the dust-collector O. The air passes through the cloth O' and through the compartment N⁵, through the channel N⁴, leading to the suction-fan N⁶. The cloth O' carries the impurities along to be finally brushed off by the revolving brush V, which discharges the impurities and dust onto the conveyer-screw W, moving the said impurities through the openings V⁶ to the outside. The stock as it passes onto the screen E is also subjected to suction from the suction-fan R⁵, which suction takes place above the screen E through the cloths O' and S', as previously described, so that any fluffy fiber contained in the stock is drawn immediately upward against the under side of the cloths O' and S' and deposited by the two latter onto the conveyer-screws W and W', which carry all impurities to the outside of the machine.

The stock passing once through this machine needs no further grading or purifying, as the material is thoroughly treated and thoroughly purified and graded when it leaves the machine and the chutes of the shaking-frame Q¹¹.

It will further be seen that the stock is not subjected to heavy strain or pressure, so that the middlings are not crushed or floured, as is so frequently the case in the purifiers as now constructed.

Having thus fully described our invention, we claim as new and desire to secure by Letters Patent—

1. In a middlings-purifier and dust-collector, the combination, with the frame and a screen mounted to swing, of an arm adapted to be engaged by an eccentric, a link pivoted to the lower end of the arm and to the frame, a second arm adjustably secured to the first arm, and a link pivoted to the upper end of the second arm and to the screen, substantially as described.

2. In a middlings-purifier and dust-collector, a vibrating attachment comprising a shaft having an eccentric, an arm engaged by the said eccentric and having teeth, a link pivotally connected with the said arm, and a second arm having teeth in mesh with the teeth of the first-named arm, said arms being bolted together, substantially as shown and described.

3. In a middlings-purifier and dust-collector, the combination, with a frame, of a bolting-cloth having a welt at its sides, beams provided with rabbets having recesses, recessed strips fitting and secured in the rabbets of the beams, and bolts engaging said beams for adjusting them, substantially as described.

4. In a middlings-purifier and dust-collector, the combination, with a frame, of vertically-adjustable beams at the sides of the frame, a bolting-cloth having one end secured to one end of the frame and its edges secured to said beams, a bar secured to the other end of the cloth, and screws for adjusting said bar, substantially as shown and described.

5. In a middlings-purifier and dust-collector, a screen comprising a frame, a bolting-cloth stretched on the under side of the said frame, side beams provided with rabbets and strips for fastening the sides of the said bolting-cloth, screw-rods screwing into the said beams and mounted to turn on the said frame for raising and lowering the said beams, and buttons or hooks for fastening one end of the said bolting-cloth to the head of the said frame, and an adjustable bar held on the foot of the said frame and on which the lower end of the said bolting-cloth is secured, substantially as shown and described.

6. In a middlings-purifier and dust-collector, the combination, with transversely-extending adjustable guideways, of shoes fitted to slide on the said guideways, a longitudinally-extending beam supported on the shoes, a brush secured on the top of the said beam, and means, substantially as described, for imparting an intermittent transverse motion to the said beam, as set forth.

7. In a middlings-purifier and dust-collector, the combination, with two horizontal sprocket-chains mounted to travel, and each provided with a vertical pin, of a brush-beam carrying a brush and provided with bent arms, each having a lug and a shoulder adapted to be engaged by the vertical pins of the said sprocket-chains, substantially as shown and described.

8. In a middlings-purifier and dust-collector, the combination, with a screen and adjustable guideways extending transversely under the screen, of a longitudinal brush-beam provided with a shoe at each end fitting upon the guideways, and with arms, each having a lug and a shoulder, endless chains provided with pins, and means for operating said chains, substantially as described.

9. In a middlings-purifier and dust-collector, the combination of a frame provided with a series of compartments and suction and blast channels communicating with said compartments, suction and blast fans, channels connecting the fans respectively with the suction and blast channels, a vibrating screen above the compartments, and a dust-collector above the vibrating screen and having an endless traveling cloth passing through one of the suction-channels, substantially as herein shown and described.

10. In a middlings-purifier and dust-collector, the combination of a frame provided with a series of compartments and suction and blast channels between the compartments and communicating therewith, suction and blast fans, channels connecting with the blast-channels at their lower ends and leading to the blast-fan, a channel connected with the suction-channels and with other channels leading to the suction-fan, a dust-collector having an endless traveling cloth passing through one of the suction-channels, and a vibrating screen below the dust-collector, substantially as herein shown and described.

11. In a middlings-purifier, a frame provided with a series of compartments provided with a series of hoppers and pivoted valves, and vertical suction and blast channels having valved openings leading to the compartments opposite the valves of said compartments, the suction-channels being at the end and middle of the frame and the blast-channels between the suction-channels, substantially as herein shown and described.

12. In a middlings-purifier, a frame having the compartments $K$, $K'$, $K^2$, and $K^3$, provided with the central triangular beams $P^3$ $P^4$ $P^5$, the beveled beams $P^6$ opposite the central beams and forming with them a series of hoppers, and the valves $P$ $P'$ $P^2$ above the said beams $P^3$ $P^4$ $P^5$, the suction-channels $K^4$ $K^5$ $K^7$, and the blast-channels $K^6$ $K^8$ between the suction-channels, the said channels being provided with valved openings leading into the compartments, substantially as herein shown and described.

13. In a middlings-purifier, the combination, with a vibrating frame having a bolting-cloth of different mesh-section and a series of hoppers below the same, of a series of compartments $K$ $K'$ $K^2$ $K^3$, receiving the graded middlings from the said hoppers, and each provided with a series of hoppers and valves, one above the other, suction-channels $K^4$ $K^5$ $K^7$, blast-channels $K^6$ $K^8$ between the suction-channels, said channels being provided with openings leading into the compartments, and a suction and blast fan connected, respectively, with the said channels, substantially as herein shown and described.

14. A middlings-purifier and dust-collector, consisting of a vibrating frame having a bolting-cloth of different mesh-section, a series of hoppers below the frame, a series of compartments below the hoppers, each having a series of hoppers and valves arranged one above the other, a series of suction and blast channels provided with valved openings leading into the compartments, a series of chutes below the hoppers of the compartments, suction and blast fans connected with the suction and blast channels, respectively, and a dust-collector above the vibrating frame and comprising a traveling cloth and a suction-fan, substantially as herein shown and described.

15. In a middlings-purifier and dust-collector, the combination, with a vibrating screen, of one, two, or more dust-collectors arranged over the said screen, and each comprising a suction-fan, an endless traveling cloth, the air passing through the traveling cloth, while the fluffy fiber of the middlings on the said screen adheres to the said cloth and is carried along by the same, and transversely-extending loosely-swinging screens arranged between the said endless cloth and the top of the screen, substantially as shown and described.

16. In a middlings-purifier and dust-collector, the combination of a dust-collector cloth provided with strips on its inner surface and a table between rollers of the said cloth, and provided with longitudinal grooves to receive the strips of the cloth, substantially as and for the purpose set forth.

FERDINAND C. MILLER.
JOHN H. WALKER.

Witnesses:
A. E. DAVIS,
L. C. CAPLES.